US 6,727,806 B1

(12) United States Patent
Massie et al.

(10) Patent No.: US 6,727,806 B1
(45) Date of Patent: Apr. 27, 2004

(54) TRUCK TAILGATE POSITION INDICATOR

(76) Inventors: Jerold L. Massie, 54800 Massie La., Powhatan Point, OH (US) 43942; George C. Mitchell, 54800 Massie La., Powhatan Point, OH (US) 43942

( * ) Notice: Subject to any disclaimer, the term of this patent is extended or adjusted under 35 U.S.C. 154(b) by 0 days.

(21) Appl. No.: 10/273,622

(22) Filed: Oct. 18, 2002

(51) Int. Cl.[7] ............................................. B60R 25/10
(52) U.S. Cl. .................. 340/426.24; 340/687; 340/438; 116/28 R
(58) Field of Search ............................. 340/426.24, 687, 340/426.15, 426.29, 438, 457, 545.1; 116/35 R, 28 R

(56) References Cited

U.S. PATENT DOCUMENTS

| | | | |
|---|---|---|---|
| 3,789,357 A | * 1/1974 | Fritz, Jr. ..................... | 180/286 |
| 5,513,869 A | * 5/1996 | Putnam ..................... | 280/415.1 |
| 5,563,483 A | * 10/1996 | Kowall et al. .............. | 318/283 |
| 5,602,526 A | * 2/1997 | Read ........................... | 340/457 |
| 6,065,423 A | * 5/2000 | Hensel ....................... | 116/35 R |
| 6,137,419 A | * 10/2000 | Lennox et al. .............. | 340/687 |
| 6,520,558 B1 | * 2/2003 | Katterloher et al. ... | 296/100.06 |

* cited by examiner

*Primary Examiner*—Daniel J. Wu
*Assistant Examiner*—Phung Nguyen

(57) ABSTRACT

The truck tailgate position indicator is a warning system for pickup trucks that would alert the driver when the tailgate is in the lowered, or open, position. The device would consist primarily of a push button switch mounted in the truck bed such that the tailgate would push the button upon being closed, a control circuit, an indicator light, an override switch, a buzzer, and mounting hardware. When the tailgate was closed, the switch would automatically be pressed, opening the control circuit and disabling the warning light and the audible alarm. Opening the tailgate would release the switch, thereby completing the control circuit and enabling the warning system. A manual override switch would be provided to disable the warning system for those occasions when the driver wishes to travel with the tailgate in the lowered position without having a constant reminder.

11 Claims, 4 Drawing Sheets

TRUCK TAILGATE POSITION INDICATOR

BACKGROUND OF THE INVENTION

1. Field of the Invention

The present invention relates to a vehicle indicator for use in connection with monitoring the tailgate position on a truck, and more specifically to indicate to the user whether or not the truck tailgate is open or closed. The truck tailgate position indicator has particular utility in connection with allowing the user to be notified, while in the cab of the truck, if the tailgate is open or closed.

2. Description of the Prior Art

Pickup trucks manufactured today are normally equipped with a latch system for securement of the tailgate which is operated by a center latch handle. While the center latch handle is visible to the owner or operator of the truck, the latching members are typically hidden or embedded into the interior of the tailgate. In order to verify whether or not the tailgate is closed properly, the owner or operator usually grasps the tailgate and pulls to ensure that the inner workings of the latching system are locked in to place. Additionally, the owner or operator can perform visual verification by intermittently inspecting the position of the tailgate via the rearview mirror located in the operator's compartment. However, with the advent of a variety of pickup truck box covers, neither of the above tailgate verification methods can be used.

Today, owners and operators of pickup trucks often use these vehicles as an everyday means of transportation instead of cars. To make this a viable mode of personal transportation, an enclosed cargo compartment is needed in order to serve as a trunk. A variety of pickup truck box covers are available today that come in many shapes and sizes that include both rigid and soft material. But no matter what the style or material used for the cargo box covers, there are two commonalities that can cause problems for the owner or operator of a pickup truck. First, the cargo box covers extend over the edge of the tailgate making it impossible to grasp the tailgate and pull in order to verify that the latching mechanism is in place. Second, the covers completely block the view of the tailgate from the rearview mirror in the operator compartment. These two drawbacks can occasionally result in the owner or operator being unaware that the tailgate is open or has opened while the truck is in motion, leading to possible loss or damage of items stored in the bed of the truck.

The use of pickup truck tailgate monitors is known in the prior art. For example, U.S. Pat. No. 6,137,419 to Christina M. Lennox, Bradford M. Lennox and Paul J. Huber discloses a tailgate monitor, which includes a control panel, an audible alarm, a master switch and a monitor switch. An indicator light is illuminated when the system is operational, and an audible alarm is activated when the tailgate is open. However, since current warning and indicator lights provided in production vehicles are activated only when a particular function is not operational, the Lennox, et al. '419 device could cause operator confusion since it functions in the opposite manner as most other indicators in the vehicle by activating when a certain function is operational. Additionally, the Lennox, et al. '419 patent has a manual override button, but does not automatically reset the system when the vehicle is restarted. Without an automatic reset of the system, an operator could easily forget to enable the system, which could result in the tailgate being in an unexpected position without the user's knowledge. Furthermore, the Lennox, et al. '419 device uses only an audible buzzer to indicate when the tailgate is down. A warning system with only an audible buzzer may not be noticed in the compartment of a pickup truck where other loud noises, such as the radio or road noise, are present or if the driver is hearing impaired.

U.S. Pat. No. 6,177,866 B1 to Patricia O'Connell discloses a tailgating warning system that indicates, via a warning sign, to other vehicles when they are too close to the rear of the vehicle. However, the O'Connell '866 B1 patent cannot determine if the tailgate of a pickup truck is up or down since it only measures distance from the vehicle to another vehicle directly behind it. Furthermore, the indicator on the O'Connell '866 B1 device fails to notify the driver if a vehicle is tailgating, instead warning only the occupants of the vehicle directly behind.

Moreover, the O'Connell '866 B1 patent does not discuss any method for measuring or determining the status of a compartment or door on the vehicle. Finally, complex features such as the photo-electric cells and the apparatus used for communication between the accelerator and the photo-electric cells and the illumination devices would cause the O'Connell '866 B1 design to be excessively complicated and cost prohibitive for most users.

Similarly, U.S. Pat. No. 6,065,423 to Raymond L. Hensel discloses the design for an indicator device that alerts the driver of a pickup truck as to the orientation of the by utilizing a rod, in several embodiments, that extends out and to the side in order for the driver of the pickup truck to determine the position of the tailgate. However, the Hensel '423 patent requires that the operator frequently check the side view mirrors in order to determine the position of the tailgate. An additional deficiency in the Hensel '423 patent is that it makes no provision for activating a warning buzzer or light when the tailgate is down. Furthermore, the Hensel '423 patent requires the rod to extend outward past any part of the pickup truck in order for the driver to visually inspect the position of the rod. This extension could be excessive and would be impossible to implement in some pickup truck models, such as dual wheeled versions. Finally, the rod extension suggested by the Hensel '423 patent would not be suitable for use at construction sites, farms, ranches or in heavily wooded areas where an object extended from a truck could cause damage or become easily dislodged.

U.S. Pat. No. 3,924,558 to Alfred Di Grazia discloses a door position indicator mounted on the frame of the rear pull-down door of a truck. This indicator device would be exposed to the view of the driver via the side view mirrors of the truck. However, the Di Grazia '558 patent requires that the operator frequently check the side view mirrors in order to determine the position of the tailgate and does not address a method of notifying the operator with a buzzer or warning light. Additionally, the Di Grazia '558 patent suggests that the rod indicator extend out past any part of the truck in order for the rod to remain in plain view to the driver. This extension of the rod would be excessive in the case of some truck models such as dual wheeled versions. Finally, due to the low placement of the rod in the Di Grazia '558 patent, it would not be visible via the rear view mirror located in the operator compartment of the truck, and any view of it could possibly be obstructed by obstacles in the bed of the truck.

Likewise, U.S. Pat. No. Des.323, 788 to Ken Roberts, Miles Conklin, Doug Wolff and Mark T. Salander discloses the ornamental design of a door or window signal transmitter for alarm systems. However, the Roberts, et al. '788 patent does not mention any method or capability to indicate to the user of a vehicle the position of the tailgate on a pickup truck. Furthermore, the Roberts, et al. '788 patent does not provide a method for installing the device into pickup trucks.

Lastly, U.S. Pat. No. 2,576,017 to John Jeffery and Thomas T. May discloses a vehicle hood position warning indicator. The primary drawback of using the Jeffery, et al. '017 patent in conjunction with monitoring the status of the tailgate position is that it makes no provision for an override capability in the event that the driver of the vehicle wishes for the tailgate to remain in the lowered position. A further deficiency is that the Jeffery, et al. '017 patent provides an emergency brake warning light which is redundant since it is already provided in most pickup trucks and other vehicles today.

While the above-described devices fulfill their respective, particular objectives and requirements, the aforementioned patents do not describe a truck tailgate position indicator that notifies the driver of the current tailgate position and of a change in the tailgate position during operation of the vehicle. To determine the position of the tailgate with the Hensel '423 and Di Grazia '558 devices, the driver must frequently check the side view mirrors causing him to pay less attention to the road and cars in front of him. Moreover, the rod indicator of the Hensel '423 and Di Grazia '558 devices could extend outward to a point that it would be unsafe to drive the vehicle, and the low placement of the rod in the Di Grazia '558 patent would render it impossible to be seen through the rear view mirror located in the operator compartment of the truck. Furthermore, the O'Connell '866 B1, Hensel '423 and Roberts, et al. '788 patents make no provision for activating a warning buzzer or light when the tailgate is down, while the Lennox, et al. '419 patent uses only an audible buzzer to indicate when the tailgate is down. A warning system with only an audible buzzer may not be noticed in the compartment of a pickup truck where other loud noises, such as the radio or road noise, are present or if the driver is hearing impaired. Moreover, the O'Connell '866 B1 device cannot determine if the tailgate of a pickup truck is up or down since it only measures distance from the vehicle to another vehicle directly behind it. The complexity of the apparatus necessary to measure such a distance could make the O'Connell '866 B1 cost prohibitive. The Jeffery, et al. '017 patent makes no provision for an override capability in the event that the driver of the pickup truck wishes for the tailgate to stay in the downward position. Although the Lennox, et al. '419 device has a manual override button, it does not automatically reset the system each time the vehicle is started, which could result in the operator's failure to enable the system. In addition, the Lennox, et al. '419 device could cause driver confusion since it functions in the opposite manner as most other indicators in the vehicle by activating when a certain function is operational instead of when it is nonoperational. Finally, the Roberts, et al. '788 patent makes no provision for installing the device in a pickup truck, and the Jeffery, et al. '017 patent provides an emergency brake warning light which is redundant since it is already provided in most pickup trucks and other vehicles today.

Therefore, a need exists for a new and improved truck tailgate position indicator that can be used for indicating whether the tailgate of a pickup truck is opened or closed and whether this status changes during operation of the vehicle. In this regard, the present invention substantially fulfills this need. In this respect, the truck tailgate position indicator according to the present invention substantially departs from the conventional concepts and designs of the prior art, and in doing so provides an apparatus primarily developed for the purpose of alerting a pickup truck driver of the opened or closed position of the tailgate.

SUMMARY OF THE INVENTION

In view of the foregoing disadvantages inherent in the known types of truck tailgate position indicators now present in the prior art, the present invention provides an improved truck tailgate position indicator, and overcomes the above-mentioned disadvantages and drawbacks of the prior art. As such, the general purpose of the present invention, which will be described subsequently in greater detail, is to provide a new and improved truck tailgate position indicator and method which has all the advantages of the prior art mentioned heretofore and many novel features that result in a truck tailgate position indicator which is not anticipated, rendered obvious, suggested, or even implied by the prior art, either alone or in any combination thereof.

To attain this, the present invention essentially comprises a push button switch mounted such that the tailgate pushes the switch when it is closed, a control circuit, wiring, an indicator light, an override switch, a buzzer, and mounting hardware. The control circuit determines the status of the tailgate from the push button switch and, using this information plus the status of the override switch, determines whether the indicator light and buzzer should be activated.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved truck tailgate position indicator that has all of the advantages of the prior art truck tailgate position indicators and none of the disadvantages.

It is another object of the present invention to provide a new and improved truck tailgate position indicator that may be easily and efficiently manufactured and marketed.

An even further object of the present invention is to provide a new and improved truck tailgate position indicator that has a low cost of manufacture with regard to both materials and labor, and which accordingly is then susceptible of low prices of sale to the consuming public, thereby making such a truck tailgate position indicator economically available to the buying public.

Still another object of the present invention is to provide a new truck tailgate position indicator that provides in the apparatuses and methods of the prior art some of the advantages thereof, while simultaneously overcoming some of the disadvantages normally associated therewith.

Even still another object of the present invention is to provide a truck tailgate position indicator for alerting the driver of a pickup when the tailgate is in the lowered position. This allows the driver full knowledge of the status of the tailgate position during travel, eliminating the need to constantly visually check the tailgate, particularly if the truck has a cover or cap installed. Yet another object of the present invention is to provide a truck tailgate position indicator that notifies the driver at any point during his travels if the tailgate is in the lowered position. This could prevent loss, theft, or damage of belongings in the truck bed.

Still yet another object of the present invention is to provide a truck tailgate position indicator having both a visual and audible warning. Having both indicators ensures that the warning will be hard to overlook, providing a visual warning in case the buzzer cannot be heard over the radio or road noise and an audible warning in case the light cannot be seen due to glare.

Lastly, it is an object of the present invention to provide a new and improved truck tailgate position indicator that has a manual override switch for disabling the warning system. This allows the driver to turn the warning system off for those occasions when he desires to travel with the tailgate in the lowered position.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
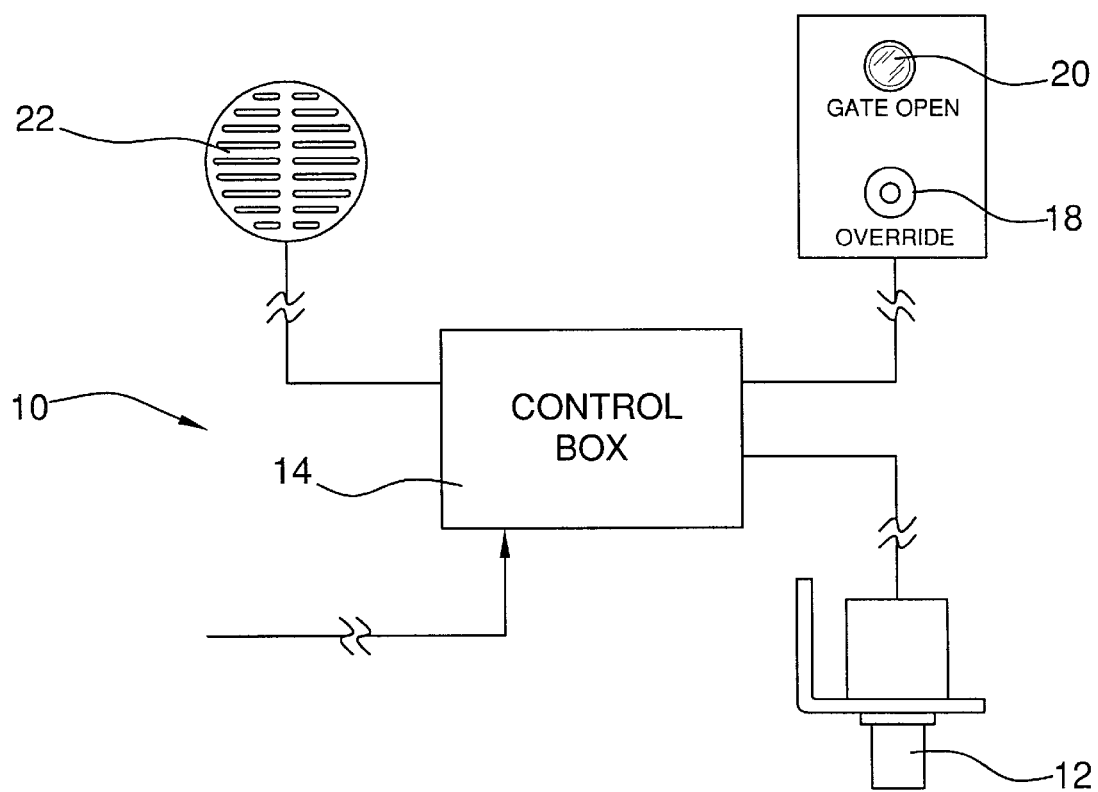
FIG. 1 is a functional diagram of the preferred embodiment of the truck tailgate position indicator constructed in accordance with the principles of the present invention.

Referring now to the drawings, and particularly to FIGS. 1–4, a preferred embodiment of the truck tailgate position indicator of the present invention is shown and generally designated by the reference numeral 10.

In FIG. 1, a new and improved truck tailgate position indicator 10 of the present invention for alerting a pickup truck driver when the tailgate is open is illustrated and will be described. More particularly, the truck tailgate position indicator 10 has a normally closed tailgate switch 12 which is mounted on the rear of the truck and activated when the tailgate is shut. The tailgate switch 12 feeds a control box 14 located under or in the dashboard of the truck 16 (see FIG. 2). The control box 14 uses information from the tailgate switch 12 and the manual override switch 18 mounted on the dashboard to determine whether the tailgate open warning light 20 should be illuminated and the alarm buzzer should be sounded through the speaker 22.

Figure 2:
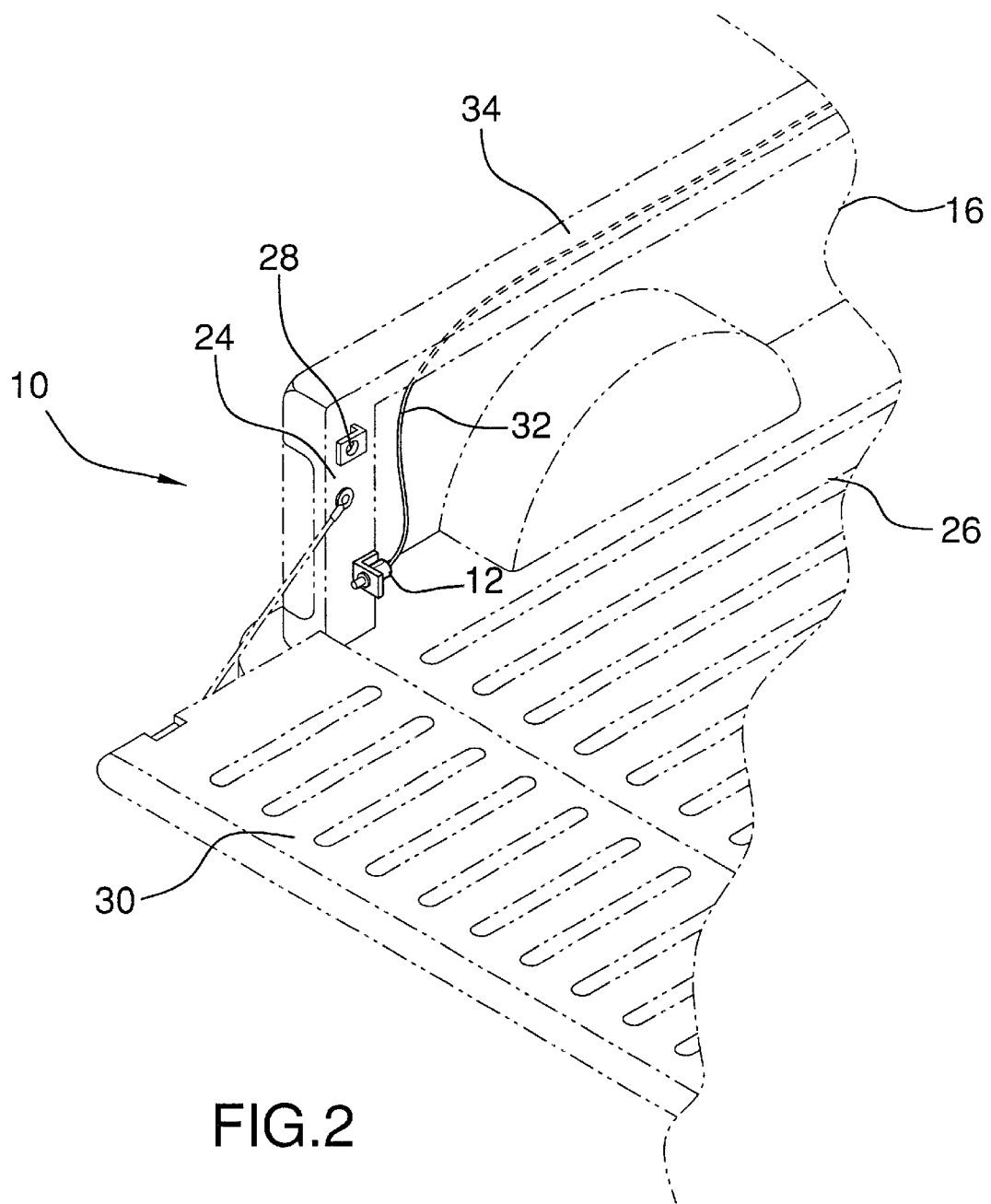
FIG. 2 is a side perspective view of the truck tailgate position indicator of the present invention.

FIG. 2 shows a side perspective view of the tailgate switch 12 of the truck tailgate position indicator 10. The tailgate switch 12 is mounted on the tailgate frame 24 of the truck bed 26 just below the tailgate latch 28. The tailgate switch 12 is in a closed position when the tailgate 30 is down and in an open position when the tailgate 30 is up. An electrical wire 32 runs under the side panel 34 of the truck bed 26 to connect the tailgate switch 12 to the control box 14.

Figure 3:
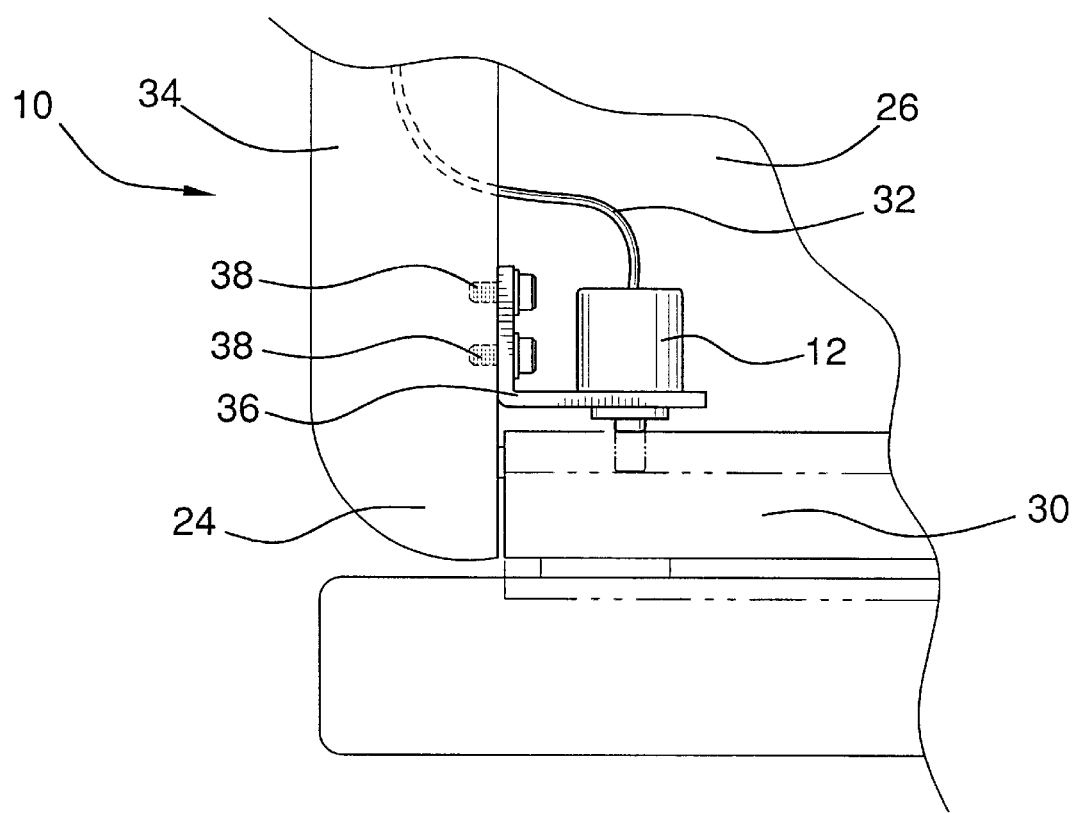
FIG. 3 is a top view of the truck tailgate position indicator of the present invention.

FIG. 3 shows a top view of the tailgate switch 12 of the truck tailgate position indicator 10. The tailgate switch 12 is mounted to the tailgate frame 24 with an L-shaped mounting bracket 36 that is held in place by a pair of bolts 38. This positions the push button tailgate switch 12 so the tailgate 30 pushes the tailgate switch 12 when it is raised up and closed. Since the tailgate switch 12 is normally in the closed position, raising the tailgate 30 places it in the open position. This information is passed along the electrical wire 32, which is placed under the side panel 34 of the truck bed 26, to the main control box 14 in the dashboard.

Figure 4:
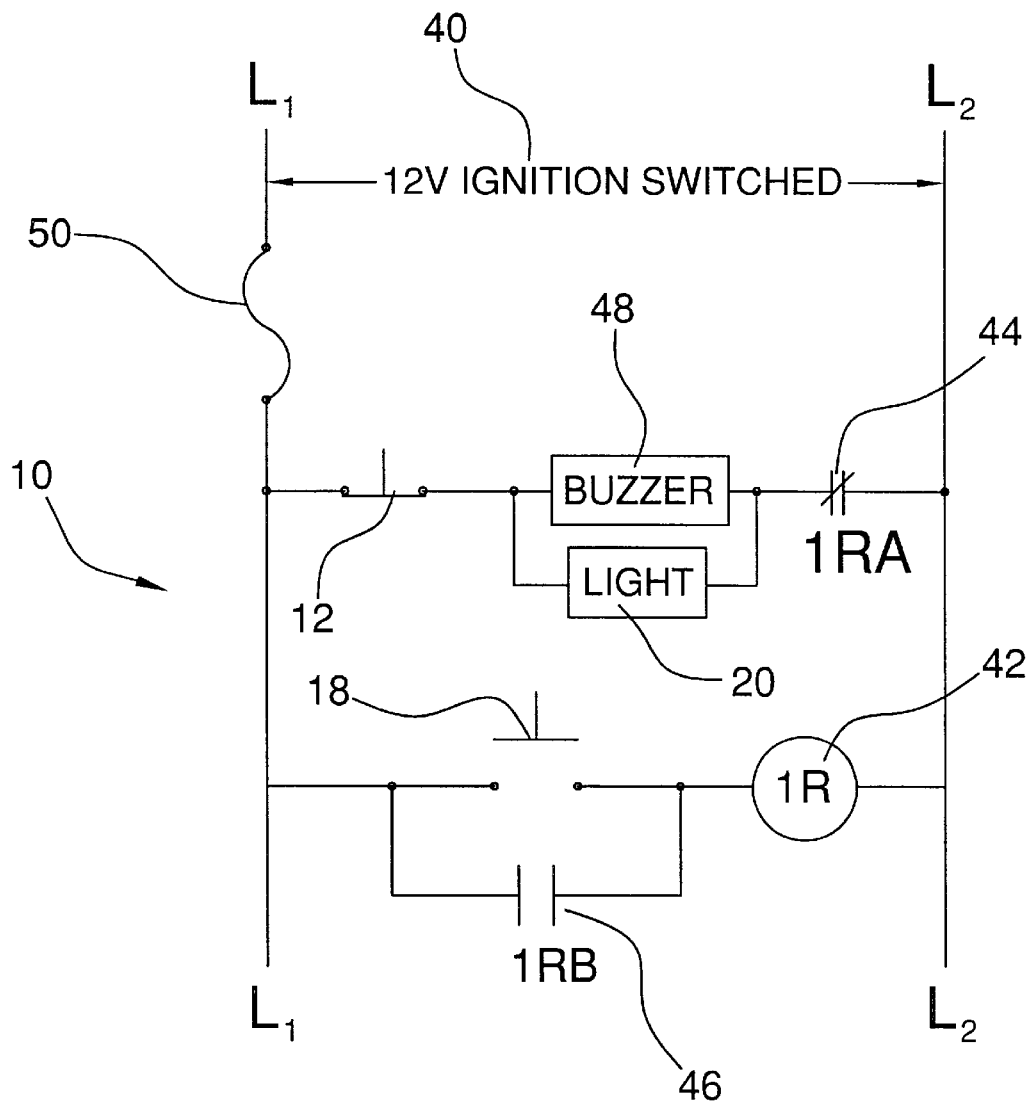
FIG. 4 is a control system ladder diagram of the truck tailgate position indicator of the present invention.

FIG. 4 shows a control system ladder diagram of the truck tailgate position indicator 10. The 12-volt supply 40 is supplied to the circuit when the ignition is on. This creates a potential drop across the master relay control (1R) 42 which dictates the state of the tailgate switch relay (1RA) 44 and the override switch relay (1RB) 46. The tailgate switch relay 44 is normally in a closed position, enabling the buzzer 48 and the tailgate open warning light 20. When the tailgate 30 is closed, it presses the tailgate switch 12, opening the tailgate switch relay 44 and disabling the buzzer 48 and the tailgate open warning light 20. The override switch relay 46 resides in an open state until the driver presses the manual override switch 18. Pressing the manual override switch 18 closes the override switch relay 46, effectively disabling the buzzer 48 and the tailgate open warning light 20. This allows the driver to knowingly ride with the tailgate open without the continuous reminder from the buzzer 48 and the warning light 20. When the ignition is turned off and the 12-volt supply 40 disappears, the master relay control 42 is de-energized and the system is reset. Once the override switch 18 has been pressed, switching the ignition off and then back on is the only way to reset the master relay control 42. The entire circuit is protected by a fuse 50 which is placed in parallel with the tailgate switch 12 and the override switch 18.

The truck tailgate position indicator is a warning system for pickup trucks that would alert the driver when the tailgate is in an open position. This would prevent inadvertently traveling with the tailgate in the lowered, horizontal state and the possible loss, theft, or damage of belongings in the bed of the pickup. This device would also eliminate the need to visually check the tailgate, particularly when the truck has a tonneau cover or cap installed.

The truck tailgate position indicator would consist primarily of a control switch, wiring, an indicator light, an override switch, a buzzer, and mounting hardware. A weatherproof push style switch would be mounted in the truck bed. When the tailgate was closed, the switch would automatically be pressed in, breaking the circuit to the audible alarm and warning light. Opening the tailgate and releasing the switch would complete the circuit between the truck's 12-volt power supply and these warning systems.

The warning buzzer could be installed in a hidden location beneath the dashboard, and the warning light would be installed on the dash near the driver so it could not be overlooked. A small manual override switch would be included in the frame for the warning light. This switch would be used when the driver desires to drive with the tailgate in the lowered position without the constant reminder of the light and the buzzer.

In use, it can now be understood that owner would install the truck tailgate position indicator in his pickup up truck by mounting the tailgate switch to the rear tailgate frame at a point below the tailgate latch. The wiring would be secreted below the upper edge of the truck bed's sidewall and would attach to the main control logic placed under the dashboard. The buzzer could also be placed under the dashboard, while the warning light and manual override would be connected to the dash near the driver. When the driver started the ignition, he would check the warning light and listen for the buzzer. If these warnings indicated that the tailgate was in the lowered position, the driver would walk to the back of the truck and secure the tailgate, deactivating the warning system, before continuing on his way. If the driver desired to travel with the tailgate in the lowered position, he would simply press the override button and continue on his way. The system would be reset each time the ignition was switched on after being turned off.

While a preferred embodiment of the truck tailgate position indicator has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable push style switch may be used for the tailgate switch or the manual override switch. And although alerting a pickup driver of a lowered tailgate has been described, it should be appreciated that the truck tailgate position indicator herein described is also suitable for use in delivery vans, trucks, trailers, and the like wherein damage or expensive losses could result from traveling with rear doors ajar. Furthermore, a wide variety of lights or alarms could be used in lieu of the buzzer and indicator described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A truck tailgate position indicator comprising:

an L-shaped mounting bracket having a longer leg with a front surface and a rear surface and formed with a transverse aperture from said front surface to said rear surface and a perpendicular shorter leg with a front surface and a rear surface and formed with a plurality of transverse apertures from said front surface to said rear surface and connected on said rear surface of said shorter leg to the upper rear portion of the side panel of the bed of a pickup truck wherein said front surface of said longer leg faces and is parallel and in close proximity to the raised tailgate of said pickup truck;

a push-button tailgate switch having an open position, a closed position, and a main body with an extended push button and connected to said transverse aperture of said longer leg of said mounting bracket wherein said tailgate of said pickup truck will press said tailgate switch and place said tailgate switch in said open position when said tailgate is placed in the vertical locked position;

a plurality of bolts connected to said mounting bracket at said plurality of transverse apertures in said shorter leg wherein said bolts hold said mounting bracket securely to said side panel of said bed of said pickup truck;

a plurality of electrical wires, each having a first end, a central portion, and a second end, and connected on said first ends to said main body of said tailgate switch;

a control circuit connected to said second ends of said plurality of electrical wires;

an indicator light connected to said control circuit;

an override switch connected to said control circuit;

a fuse connected to said tailgate switch and to said override switch;

a relay control;

a first relay having an open position and a closed position wherein said relay is normally in said closed position and connected to said indicator light and said relay control wherein said relay control places said first relay in said open position, disabling said indicator light, when said tailgate switch is pushed and places said first relay in said closed position, enabling said indicator light, when said tailgate switch has not been pushed; and a second relay having an open position and a closed position wherein said relay is normally in said open position and connected to said indicator light and said relay control wherein said relay control places said second relay in said closed position and disables said indicator light when said override switch is pushed; and wherein said control circuit is reset when the ignition of said pickup truck is switched off and then on wherein said first relay is placed in said closed position, enabling said indicator light, and said second relay is placed in said open position.

2. The truck tailgate position indicator of claim 1 wherein control circuit is placed under the dashboard of said pickup truck.

3. The truck tailgate position indicator of claim 2 wherein said central portions of said plurality of electrical wires are placed under the edge of the side panel of the bed of said pickup truck while being routed from said tailgate switch to said control circuit.

4. The truck tailgate position indicator of claim 1 further comprising:
a rectangular indicator light panel having a front surface, a rear surface, a top, a bottom parallel to said top, a right side perpendicular to said top and joining said top to said bottom, and a left side parallel to said right side and joining said top to said bottom and connected on said front surface to said indicator light and said override switch.

5. The truck tailgate position indicator of claim 4 wherein said rear surface of said indicator light panel is mounted on the dashboard of said pickup truck.

6. A truck tailgate position indicator comprising:
an L-shaped mounting bracket having a longer leg with a front surface and a rear surface and formed with a transverse aperture from said front surface to said rear surface and a perpendicular shorter leg with a front surface and a rear surface and formed with a plurality of transverse apertures from said front surface to said rear surface;
a push-button tailgate switch having an open position, a closed position, and a main body with an extended push button and connected to said transverse aperture of said longer leg of said mounting bracket;
a plurality of bolts connected to said mounting bracket at said plurality of transverse apertures in said shorter leg;
a plurality of electrical wires, each having a first end, a central portion, and a second end, and connected on said first ends to said main body of said tailgate switch;
a control circuit connected to said second ends of said plurality of electrical wires;
an indicator light connected to said control circuit;
an alarm buzzer connected to said control circuit;
a speaker connected to said alarm buzzer;
an override switch connected to said control circuit;
a fuse connected to said tailgate switch and to said override switch;
a relay control;
a first relay having an open position and a closed position wherein said relay is normally in said closed position and connected to said indicator light, said alarm buzzer, and said relay control wherein said relay control places said first relay in said open position, disabling said indicator light and said alarm buzzer, when said tailgate switch is pushed and places said first relay in said closed position, enabling said indicator light and said alarm buzzer, when said tailgate switch is not pushed; and a second relay having an open position and a closed position wherein said relay is normally in said open position and connected to said indicator light and said relay control wherein said relay control places said second relay in said closed position and disables said indicator light and said alarm buzzer when said override switch is pushed;
wherein said rear surface of said shorter leg of said mounting bracket is affixed to the upper rear portion of the side panel of the bed of a pickup truck wherein said front surface of said longer leg faces and is parallel and in close proximity to the raised tailgate of said pickup truck and said tailgate of said pickup truck will press said tailgate switch and place said tailgate switch in said open position when said tailgate is placed in the vertical locked position; and
wherein said control circuit is reset when the ignition of said pickup truck is switched off and then on wherein said first relay is placed in said closed position, enabling said indicator light and said alarm buzzer, and said second relay is placed in said open position.

7. The truck tailgate position indicator of claim 6 wherein alarm buzzer and said speaker are placed under the dashboard of said pickup truck.

8. The truck tailgate position indicator of claim 6 wherein control circuit is placed under the dashboard of said pickup truck.

9. The truck tailgate position indicator of claim 8 wherein said central portions of said plurality of electrical wires are placed under the edge of the side panel of the bed of said pickup truck while being routed from said tailgate switch to said control circuit.

10. The truck tailgate position indicator of claim 6 further comprising:
a rectangular indicator light panel having a front surface, a rear surface, a top, a bottom parallel to said top, a right side perpendicular to said top and joining said top to said bottom, and a left side parallel to said right side and joining said top to said bottom and connected on said front surface to said indicator light and said override switch.

11. The truck tailgate position indicator of claim 10 wherein said rear surface of said indicator light panel is mounted on the dashboard of said pickup truck.

* * * * *